Aug. 21, 1928.
J. GOODMAN ET AL
1,681,767
SHADE ROLLER
Filed Aug. 1, 1927
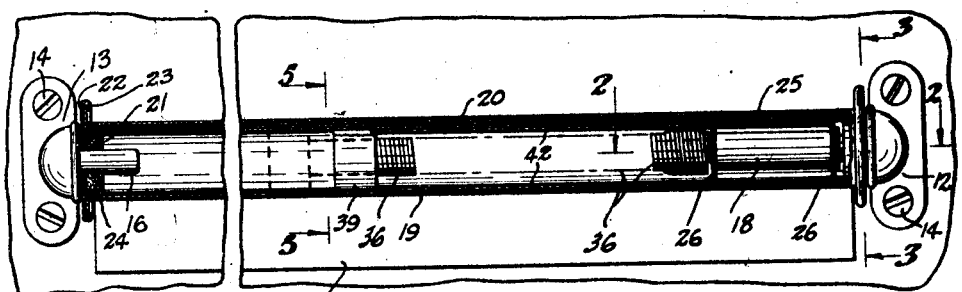
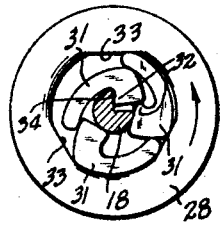
Inventors
Joseph Goodman
William A. Somers
By Wooster & Davis
Attorneys Patented Aug. 21, 1928.

1,681,767

UNITED STATES PATENT OFFICE.

JOSEPH GOODMAN, OF WHITNEYVILLE, AND WILLIAM A. SOMERS, OF HAMDEN, CONNECTICUT, ASSIGNORS TO THE MT. CARMEL MANUFACTURING COMPANY, OF MOUNT CARMEL, CONNECTICUT, A CORPORATION OF CONNECTICUT.

SHADE ROLLER.

Application filed August 1, 1927. Serial No. 209,694.

This invention relates to shade rollers, and has for an object to provide a structure for rollers of this type which will require less material, and therefore, may be made at a lower cost.

It is also an object of the invention to provide a structure in which the coil spring for operating the roller will have a greater range of movement for a given length of spring than in the constructions now generally employed, and therefore, the spring is less liable to be taxed to its limit, or that is, is less liable to be tightened too tight, and therefore, is less liable to breakage.

It is also an object of the invention to provide an improved pawl construction.

With the foregoing and other objects in view, we have devised the construction illustrated in the accompanying drawing forming a part of this specification. In this drawing, Fig. 1 is a longitudinal section through our improved roller.

Fig. 2 is a longitudinal section of the pawl end of the roller on an enlarged scale in a plane at right angles to the plane of Fig. 1, the section being substantially on line 2—2 of Fig. 1.

Fig. 3 is a transverse section substantially on line 3—3 of Fig. 1 showing the pawls in the securing position.

Fig. 4 is a similar view showing the pawls in the released position.

Fig. 5 is a detail section substantially on line 5—5 of Fig. 1.

Fig. 6 is a vertical section substantially on line 6—6 of Fig. 5.

Fig. 7 is a detail section of the spring end mount substantially on line 7—7 of Fig. 2.

Fig. 8 is a side elevation of the stationary stud element at the pawl end of the roll.

Fig. 9 is an end elevation thereof, and

Figs. 10 and 11 are side and end elevations respectively of a supporting yoke at the pawl end of the roll.

This roller is particularly adapted for automobile use as the elements are so mounted and secured that they will not rattle in operation. It is, however, not limited to this use. As shown it comprises two brackets 12 and 13 secured to the window frame or body of the car by suitable screws 14. In the present construction these brackets are formed of sheet metal open at their inner sides which is closed by a plate 15. The left hand bracket 13 may have merely a round opening for pivot stud 16, but the plate in the right hand bracket has a non-circular opening, as for instance an opening with a flat on one side thereof to receive the flattened end 17 of the stud 18 so that this stud is held stationary. The roll comprises a body member 19 of tubular sheet metal. This roll is generally made by rolling up a flat strip of metal, the side edges of which are overlapped and folded as shown in Fig. 5, and as it is desirable to have the outer surface substantially cylindrical this joint forms a rib 20 on the inside of the roll and extending longitudinally thereof. At its left end a cupped member 21 is secured in the end of the roll while the plate 22 is seated on the outer surface of this cupped member and has its periphery rolled over the edge of the cupped member, as shown at 23, to secure the two members together. These two members have openings for passage of the pivot stud 16, and the space between the members may be filled with a suitable fibre 24 which will carry sufficient oil for lubrication and will also prevent rattling of the end members on the stud.

At its opposite end the roller is carried by a yoke 25. This yoke is preferably a strip of metal substantially U-shaped as shown in Figs. 10 and 11, with circular end members 26 having openings 27 to receive the stationary member 18 and turn thereon, and thus the member 18 forms a pivot support for this end of the roller. The curved end members 26 fit the inside of the roller, and the flat side connecting these ends seats over the rib 20 and is thus prevented from turning relative to the roller.

This end of the roller is closed by a cupped member 28 which is secured to the roller by any suitable means, such as solder or punching the walls of the roll into the member. The open side of this cupped member is closed by an end plate 29 with its periphery rolled over the edges of the cupped member, as shown at 30. This cupped member carries the pawls 31. There are preferably three of these pawls although we are not limited to this number. Each pawl is substantially L-shaped as shown having a head at one end forming a hook 32 while the tail portion is curved substantially as shown corresponding to the curvature of the sides of the cupped member. The side walls of this cupped portion, however, are not made circular but include spaced flat surfaces 33 so that the side walls of this cup portion is composed of spaced alternately arranged curved and flat portions. The stud or stationary member 18 is provided with a notch or recess providing a shoulder 34 which when mounted is in the upright position and may be engaged by the hook of any one of the pawls as shown in Fig. 3, to hold the roller against rotation against the action of the spring. When the pawl is in this position the tail end engages the head end of the next adjacent pawl and forces it against the head end of the third pawl, which forces the tail end of this latter pawl between the third pawl and the side wall of the cup as shown in Fig. 3. This section clamps the two second pawls against the side walls of the cup, and although the pawls are loose within the cup when not in the holding position, that is, are not permanently attached to the cup, this clamping action acts to prevent relative turning of the cup with respect to the pawls while in this position. When the pawls are released, however, the cup may turn relative to the pawls. To increase the holding action of the pawls the flats 33 are provided, and therefore, it is not necessary to rely alone on the frictional engagement of the outer curved edges of the pawls against the curved side walls of the cup. It will, of course, be understood that if the roller is operated to the right or clockwise, as viewed in Figs. 3 and 4, the pawls will be forced outwardly and permit rotation of the roller, and if it rotates rapidly counterclockwise or in the opposite direction they will be held in the outward or released position by centrifugal action until the speed is sufficiently reduced to permit one of the pawls to drop with its hook in engagement with the upright shoulder 34, and under action of the spring clamp the pawls as indicated above.

The shade is indicated at 35 and the spring is a coil spring 36 located in the roller. At one end it is permanently secured to the stud or stationary member 18, a convenient means of securing being to force the end of the stud into one end of the spring 12, the stud being somewhat larger in diameter than the normal diameter of the spring so as to tend to spread the spring radially, and the spring will, therefore, firmly clamp the stud. The end turn 37 of the spring may then be forced into the groove 38 in the stud and prevent the spring pulling away. At its opposite end the spring is connected to a block 39. This may be a solid block or a block of any suitable material, but a cheap and convenient construction is to make it of sheet metal by stamping and cupping a suitable blank. The closed end of this cup is slit and the metal between the slits is forced laterally to receive the end of the spring after which it is clamped on the end of this spring to permanently hold it. One side wall of the cupped block is provided with a longitudinal groove 41 to receive the rib 20 on the inner wall of the roller. Cooperation of this rib and groove will prevent relative turning movement between the roller and the block but will leave the block free to slide longitudinally of the roller as the length of the spring varies due to variations in the tension of the spring as the roller is operated. Therefore, as the inner end of the spring is free to move longitudinally as the tension of the spring varies there is no tendency for this spring to buckle, and it is, therefore, not necessary to extend a rod longitudinally through this spring to provide a support or guide and prevent this buckling as is now common practice. We, therefore, save considerable material besides leaving the spring freer so that a spring of a given length will have a greater range than where it is mounted on a longitudinally extending limiting rod, and is not as quickly taxed to its limit. Therefore, in operation it is much less liable to be tightened too tight and broken for this reason, the floating block 39 doing away with any tendency of the spring to buckle or weave laterally. It is, however, desirable to line the inside of the roller with a suitable fibre lining 42 of paper or similar material to prevent noise should jarring of the vehicle cause the spring to swing against the sides of the roller. It will, also, be apparent that the length of the spring and its mounting does not vary for different lengths of rollers, and therefore, these springs with their associated elements may be assembled in quantity and merely mounted in the rollers of the lengths desired.

Having thus set forth the nature of our invention, what we claim is:

1. In a shade roller, a stationary member having a notch or shoulder, an end member having a recess about said stationary member provided with an outer wall comprising alternately arranged flat and curved portions, a plurality of pawls loosely mounted in said recess so that the end member may turn relative to said pawls, said pawls having hooks adapted to engage in said recess and tails having outer walls to engage the outer wall of the recess and so arranged that when a hook is in the recess the tail of the pawl will engage the adjacent pawl and clamp it against said wall to hold the end member against turning.

2. In a shade roller, a tubular rotary member, a stationary member at one end thereof, pawl retaining means movable with the tubular member adapted to cooperate with said stationary member to prevent turning in one direction, a torsional spring, a block secured to one end of the spring within the tubular member, said block being free to slide longitudinally of the tubular member as the tension of the spring varies, and coacting means on the member and the block to prevent relative turning movements so that the spring rotates said member in one direction by rotating the block.

3. In a shade roller, a tubular roll, a stationary element at one end on which the roll is mounted to turn, a torsional spring within the roll connected at one end to said element, a block within the roll connected to the other end of the spring so as to be rotated thereby, cooperating means on the roll and block to prevent relative turning movements between them so that rotation of the block will rotate the roll but arranged to permit free sliding movements of the block longitudinally of the roll as the tension of the spring varies, and a pawl catch adapted to cooperate with said stationary member to hold the roll against rotation under action of the spring.

4. In a shade roller, a tubular roll, a stationary element at one end on which said roll is mounted to turn, a torsional spring within the roll connected at one end to said stationary member, a block within the roll connected to the other end of the spring so as to be rotated thereby, a longitudinally extending coacting rib and groove connection between the roll and block to prevent relative turning movements between them and permitting relative longitudinal movements as the tension of the spring varies, and a pawl catch adapted to cooperate with the stationary member to hold the roll against movement under action of the spring.

5. In a shade roller, a tubular roll having a longitudinal rib on its inner wall, a stationary member at one end on which said roll is mounted to turn, a coiled torsional spring within the roll connected at one end to said stationary member, a block secured to the other end of the spring so as to be rotated thereby and having a longitudinal groove to receive said rib to permit longitudinal movement of the block while preventing its turning in the roll, and a pawl catch adapted to prevent turning movements of the roll under action of the spring.

6. In a shade roller, a tubular roll having a longitudinal rib on its inner wall, a stationary stud at one end, a substantially U-shaped yoke forming a support within the roll having bearings in its side members on said stud, a coiled spring within the roll secured at one end to said stud, a block comprising a member secured to the other end of the spring so as to be rotated thereby and having a longitudinal groove to receive the rib in the roll so that the block is free to move longitudinally of the roll but is held against turning, and a pawl catch carried by the roll and adapted to cooperate with the stud to hold the roll against turning under action of the spring.

7. In a shade roller, a tubular rotary member, a stationary member at one end thereof, a torsional spring within the tubular member connected at its opposite ends to the respective members so as to rotate the tubular member by an axial unwinding of the spring, the connection from one end of the connection to its members being a sliding connection to permit longitudinal movement of the end of the spring as the tension of the spring varies and including cooperating means to prevent relatively turning movements between the spring and said member, and a pawl catch adapted to hold the rotary member against turning movement under action of the spring.

In testimony whereof we affix our signatures.

JOSEPH GOODMAN.
WILLIAM A. SOMERS.